United States Patent
Blessinger et al.

[11] 3,895,132
[45] July 15, 1975

[54] METHOD AND APPARATUS FOR CREATING RANDOM SURFACE PATTERNS ON ARTICLES

[75] Inventors: James E. Blessinger; Alan B. Welsh, both of Jasper, Ind.

[73] Assignee: Kimball International, Inc., Jasper, Ind.

[22] Filed: June 12, 1972

[21] Appl. No.: 261,967

[52] U.S. Cl. .................. 427/227; 427/277; 427/197; 156/279; 144/309 F; 144/309 Y; 144/328
[51] Int. Cl. ............................................. B27h 1/00
[58] Field of Search .......... 156/196, 209, 276, 279, 156/320, 390; 117/8, 9, 13, 19, 31, 10; 144/309 A, 309 F, 309 V, 309 Z, 328, 309 R, 309 UA, 324, 327; 264/119, 121, 131, 132; 118/312; 96/36.2

[56] References Cited
UNITED STATES PATENTS

| | | |
|---|---|---|
| 2,345,942 | 4/1944 | Lehman .................................. 117/9 |
| 2,689,801 | 9/1954 | D'Alelio ................................. 117/9 |
| 3,069,284 | 12/1962 | Berndt ................................... 117/13 |
| 3,298,833 | 1/1967 | Gaynor ................................... 96/27 |
| 3,322,537 | 5/1967 | Giaimo ..................................... 96/1 |
| 3,547,629 | 12/1970 | Kinney et al. ........................... 96/36.2 |
| 3,732,908 | 5/1973 | White .................................. 144/328 |

*Primary Examiner*—Caleb Weston
*Attorney, Agent, or Firm*—Melvin A. Crosby

[57] ABSTRACT

A method and apparatus for imparting surface characteristics to articles such as pieces of wood, or veneered paneling, or plastic, in which heated particles of material are distributed in a random pattern on the article so as to burn, or melt, a pattern into the article, whereupon the material is removed from the article, leaving the desired pattern thereon.

7 Claims, 5 Drawing Figures

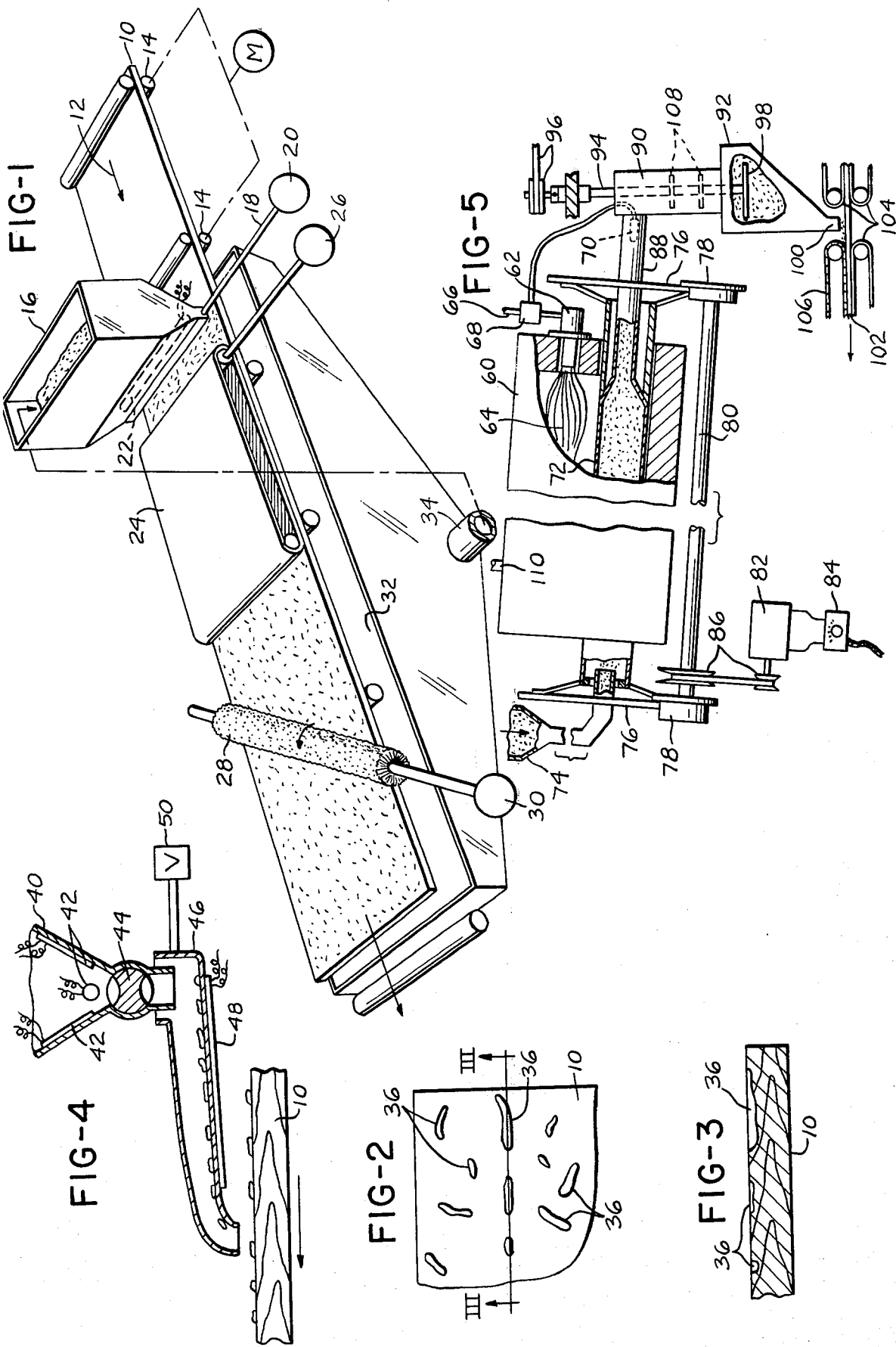

METHOD AND APPARATUS FOR CREATING RANDOM SURFACE PATTERNS ON ARTICLES

The present invention relates to a method and apparatus for imparting random surface patterns to articles such as wood, plywood, and plastic.

Articles formed of wood and plywood having a finished veneer face thereon are well known, and it is also known to form articles of plastic, especially foamed plastic such as polystyrene or polypropylene or the like in such a manner as closely to simulate the appearance of wood.

Usually, articles made in this fashion are required to be free of blemishes and this requirement can cause quite a lot of otherwise usable material to be discarded. Articles of the nature referred to having blemishes are often referred to as "distressed" and a piece of wood or a panel having blemishes in the finish is referred to as have a distressed finish.

Heretofore, wood and panels characterized in having a distressed finish had to be sold at reduced prices, but more recently, distressed finishes have become popular, and a piece of wood or panel having a distressed finish will, at the present time, often command a better price than the corresponding article free of surface blemishes.

With the foregoing in mind, the primary objective of the present invention is the provision of a method whereby distressed finishes can be imparted at will to articles such as pieces of wood, wood paneling having a finished side and plastic articles, especially those which are formed to simulate a wood finish on one side.

Another object is the provision of a method of the nature referred to in which the character of the finish can be adjusted to meet any particular requirements.

Another object is the provision of a method for imparting distressed finishes to wood and plastic surfaces which can produce treated articles at high speed.

Still another object is to provide articles of the nature referred to with a distressed finish in which sanding of the treated surface will not remove the pattern imparted thereto.

Still another object is the provision of a method by means of which an article, such as a low quality sheet of veneer, can be upgraded by imparting thereto a commercially valuable surface finish.

Another object is the provision of an apparatus especially adapted for carrying out the method of the present invention.

These and other objects and advantages of the present invention will become more apparent upon reference to the following detailed specification taken in connection with the accompanying drawings in which:

FIG. 1 is a schematic perspective view showing one form which the apparatus can take for the practice of the present invention.

FIG. 2 is a schematic view showing a surface having a distressed finish thereon.

FIG. 3 is a section indicated by line III—III on FIG. 2 showing the surface finish in cross section.

FIG. 4 is a fragmentary view showing another type of apparatus for practicing the method of the invention.

FIG. 5 is a fragmentary view showing still another apparatus for practicing the method of the present invention.

BRIEF SUMMARY OF THE INVENTION

According to the present invention, a random pattern of marks is developed in the surface of an article, such as a piece of wood or a piece of veneered plywood or a plastic article by dropping thereon heated particles of material which will form marks in the surface being treated, either by charring the article, or by softening the article, so as to create marks in the treated surface.

The material employed for creating the marks can be substantially any material that can be handled in small particle size without agglomerating into lumps and which can be raised to a suitable high temperature without deterioration of the material and which has a high enough specific heat to char wood or to soften plastic.

For example, bits of steel or iron in the form of particles and shavings, copper wire, or machine scraps, stones or pebbles, chunks of glass and the like all represent materials usable in the practice of the present invention. The materials are preferably of random size and shape so that the marks left thereby on the surface being treated will have random shape and size.

The particulate material referred to is heated to the desired temperature and is then distributed on the surface being treated by a suitable distributing mechanism and may be pressed against the surface to insure good heat transfer from the particulate material to the surface being treated. The treatment material is then removed from the article being treated and may be recycled back through the apparatus if so desired.

Among the feeding devices that can be employed are included a hopper in which the particles are heated and from which the particles are fed through a slit so as to drop on the surface of the article being treated. During such treatment, the article is moved beneath the hopper to cause the hot particles to be distributed over the entire surface being treated.

In another apparatus, particles are delivered from a heated hopper to a vibrating plate, which is also heated, and from the edge of which plate the material drops on the article being treated after being distributed on the vibrating plate due to the vibration thereof.

In still another form which the invention can take, the heated particles are dropped on a rotating disc from which the particles emerge substantially radially and fall in a random pattern on the surface being treated.

For removing the material from the articles being treated, a brush or brushes can be employed, or the material can be removed by tilting the article or by other suitable mechanical means. In any case, the material can be returned to the hopper and used again.

The marks so formed extend into the surface and will not be removed by surface finishing operations such as sanding.

DETAILED DESCRIPTION OF THE INVENTION

Referring to the drawings somewhat more in detail, FIG. 1 shows an article in the form of panel means 10 being advanced in the direction of arrow 12 as by driven roller means 14. The article 10 advances beneath a hopper 16 containing particulate material in the form of metal particles, glass, ceramic or stone, and which are fed at a controlled rate from the bottom of hopper 16 as by a feed rod 18 adapted for rotation via motor 20.

Advantageously, the particulate material in hopper 16 is heated as by electric heating means 22 contained within the hopper so that when the particles of material drop from the bottom of the hopper to the surface of article 10, they will contain sufficient heat energy to make marks on the surface of article 10. If article 10 is in the form of wood, veneered plywood, for example, the particles will be heated to a temperature which will char the wood. If the article is plastic, the particles will be heated to a temperature which will cause the plastic to soften or char.

The particles are delivered to the surface of article 10 during movement thereof and are distributed on the article and take a completely random pattern over the entire surface of the article with the individual particles spaced from each other. In this manner, a random pattern of marks is imparted to the surface of article 10 giving it what has been referred to as a "distressed" finish.

While the particles dropped on the surface will burn into the surface and form the marks, it is also possible to press the particles against the surface of article 10 while the particles are hot as by a belt 24 entrained about a pair of rollers which are driven by a motor 26. The belt 24, which is resistant to damage by the hot particles, will insure good heat transfer from the particles to the surface of article 10 and will press articles such as metal chips and shavings down against the article and thereby obtain the full benefit of the configurations of the particles.

After article 10 emerges from beneath belt 12, a diagonal brush 28 may be employed which is driven by a motor 30 to sweep the particles from the treated surface of article 10. The particles thus swept off from article 10, together with any other particles falling off the article 10, can be caught in a hopper 32 and from which the particles are withdrawn as at 34 and returned to hopper 16.

It is also possible to remove the particles from article by tilting the article or by other means so that after the article is removed from the apparatus, all that remains is a pattern of marks on the surface.

FIG. 2 shows a fragmentary view of article 10 and discloses a pattern of marks 36 thereon which correspond in shape and distribution to the shape and distribution of the hot particles distributed over the surface.

As will be seen in FIG. 3, the marks 36 penetrate into the treated surface of the aritcle and, thus, will not be removed by conventional surface treatments, such as sanding.

Other ways of distributing the particles on article 10 suggest themselves, and one thereof is shown in FIG. 4, wherein hopper 40 is adapted for containing particulate material which is heated in the hopper as by electric heating means 42. The hot particulate material is discharged from the bottom of hopper 40 by rotation of notched rod 44 and drops on a vibrator tray 46 which is provided with electric heaters 48 and with a vibrating mechanism 50.

The particles supplied to tray 46, due to the vibration thereof, distribute laterally of the tray and are dropped on the article 10 moving therebeneath in a completely random pattern. The discharge end of tray 46 is preferably substantially the same width as article 10 to promote uniform distribution of the particles laterally of article 10.

FIG. 5 shows one form of apparatus for the practice of the present invention. In FIG. 5, an elongated inclined retort 60 is provided consisting principally of heat insulating material, and in one end of which there is mounted a burner 62, a gas burner, for example, which supplies a flame 64 to the interior of the retort. Burner 62 is supplied via a conduit 66 which may have a control member 68 therein under the control of a thermostat 70 referred to more in detail hereinafter.

Retort 60 is inclined at an angle of about 6½°, and inside the retort is a stainless steel tube 72. At the higher end of the retort, the stainless steel tube communicates with the discharge line leading from a hopper 74 to which particles according to the present invention are supplied.

Tube 72 is rotatable and, at its opposite ends, has circular supporting rings 76 which rest on drive element 78 mounted on a shaft 80 driven by a motor 82. Motor 82 may be a variable speed motor and under the control of a controller 84 or the pulley and belt arrangement 86 which connects the output shaft of the motor to shaft 80 may be variable in drive ratio. The variability of the speed of motor 82 or of the drive ratio of the pulley and belt arrangement 86 permits change in speed of the speed of rotation of tube 72 thereby to control the rate in which particles feed therealong.

At the lower end of the inclined retort tube 72 terminates in a discharge portion 88 which communicates with the upper end of a tubular member 90 leading into a hopper 92. Extending axially along cylindrical portion 90 is a shaft 94 driven as by belt and pulley 96 and at the lower end carrying a disc 98 which distributes particles dropping through cylindrical portion 90 across the width of hopper 92.

Hopper 92, at the bottom, has a discharge spout 100 positioned over the path along which veneer sheets 102 are conveyed by conveyor belts 104. Downstream from discharge spout 100 there is a pressure belt 106 to bear on top of the veneer being conveyed to the apparatus to press the hot particles against the veneer.

Shaft 94 may also include distributing spider means 108 disposed within cylindrical portion 90 to obtain completely random distribution of the particles if necessary.

In any of the arrangements described, the particles are heated to a temperature which will impart marks to the material being treated. In the case of wood, the temperature may range from about 900° F. to about 1,100° F. The aforementioned thermostatic element 70, it will be noted, is interposed in the path of the particles being supplied to the vertical cylindrical portion 90 so that the supply of fuel to burner 62 can be automatically controlled to maintain the proper temperature.

The particles themselves may, for example, be about 14 to about 10 gauge metallic wire ranging from about one-fourth inch to about three-fourth inches in length. The particles may be straight, but it is preferable for some to be straight and others to be bent into various shapes thereby providing for a completely random selection in mixture of different marks on one and the same article.

The control of the speed of rotation of tube 72 permits the workpiece, in this case, the veneer sheet 102, to receive as few as five or six marks per square foot up to about fifty marks per square foot, according to the individual preference and the requirements.

The temperature inside the retort 60 is maintained at about 1,600° and the retort is well insulated to provide for efficient transfer of the heat through the tube 72 into the particles therein. It will be noted that the heat flow in the retort is in counter flow with respect to the movement of particles through tube 72 with the flame being developed at burner 62 and exhaust gases being taken off the stack 110 near the inlet end of the retort.

The process of dropping heated particles on a sheet of veneer or paneling or other article moving beneath the point of discharge of the hot particles achieves a completely random pattern of marks with the size and shape of the individual marks also varying widely.

The distressed finish thus imparted to the article represents an improvement over the branding of veneer or wood with a configured hot platen or roller because the patterns imparted to articles in this manner are not random but, rather, exhibit a repetitive effect which is undesirable. Furthermore, the making of the platens and rollers is expensive and the equipment cost is high.

Other means of producing distressed finishes often involve manual operations such as striking the surface with a length of chain or a hammer, or by scratching the surface, or applying burn marks to the surface with hot tools, or by flicking paint or the like on the surface. All of these procedures for creating a distressed finish depend a great deal on the skill of the operator and are also time consuming and are not adapted for the high speed production methods which are necessary to observe in making articles in large volume.

It will be apparent that the type of pattern which is imparted to an article by the practice of the present invention is subject to wide variation by regulating the rate of flow of the particulate material to the surface being treated and by controlling the temperature of the particles and by the selection of the particles as to size and shape and as to the distribution of the sizes. Such changes can be made quite readily merely by withdrawing one particulate medium from the system and introducing another and this can be accomplished quite simply and with minimum delay and at low cost.

Modifications may be made within the scope of the appended claims.

What is claimed is:

1. The method of imparting a pattern of marks to a surface of a heat sensitive article, in which at least the portion of the article which includes said surface softens or chars in the presence of heat which comprises; supplying heated particulate material in randomly distributed and spaced relation to said surface, said particles being heated to a predetermined temperature at which said portion of the article will soften or char thereby to cause heat to transfer from said particulate material into said article vis said surface and form marks in said surface where it is engaged by said particulate material, removing said particulate material in its entirety from said surface of the article after the said marks are formed in the surface, and again heating said particulate material to said predetermined temperature after removal thereof from the treated surface of the article for use in treating the surface of another article.

2. The method according to claim 1 which includes pressing the particulate material against said surface during said transfer of heat from the particulate material into the article.

3. The method according to claim 1 in which said particulate material comprises particles of random size and shape.

4. The method according to claim 1 in which said portion of said article is wood and said predetermined temperature is a temperature at which the wood will char.

5. The method according to claim 1 in which said portion of said article is plastic and said temperature is a temperature at which the plastic will soften or char.

6. The method according to claim 1 in which said particulate material is selected from the class of material which includes metal, glass, ceramics and stone.

7. The method according to claim 1 in which said particulate material comprises particles of random size and shape, and is selected from the class of material which includes metal, glass, ceramics and stone.

* * * * *